Figure 1:
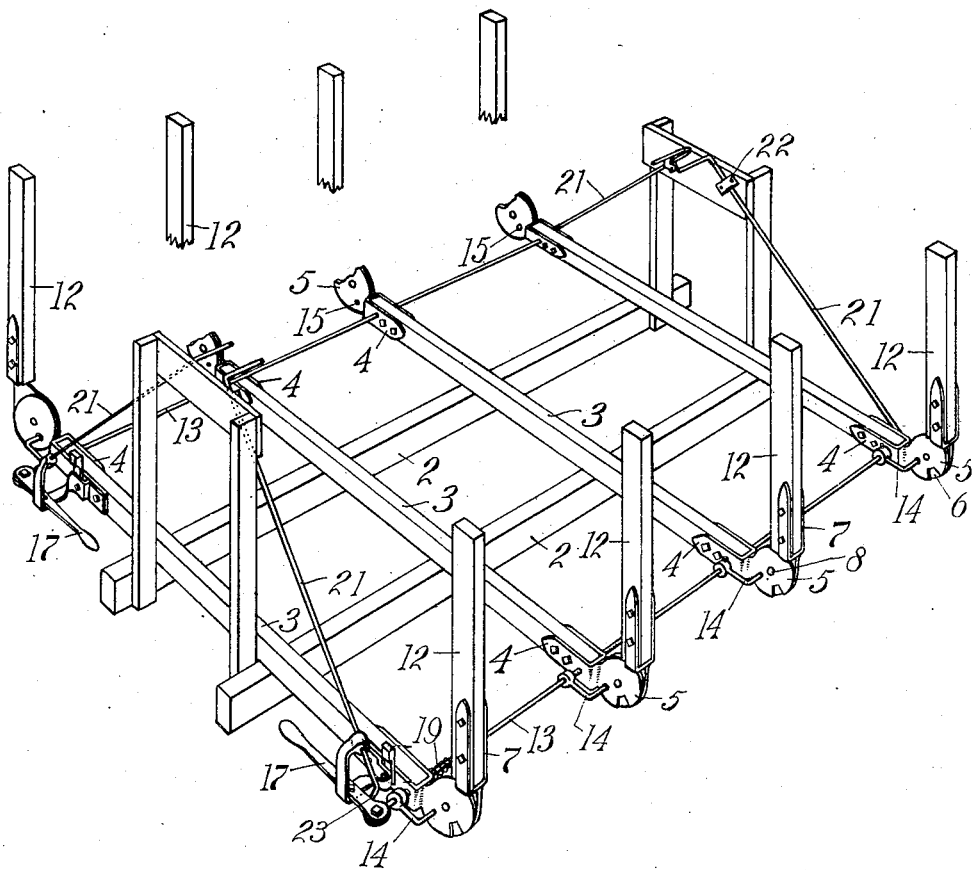

No. 897,363. PATENTED SEPT. 1, 1908.
C. GILLSON.
HAY RACK.
APPLICATION FILED SEPT. 26, 1907.

2 SHEETS—SHEET 1.

Witnesses,
George Voelker

Inventor,
Charles Gillson
by Lothrop Johnson
his Attorneys.

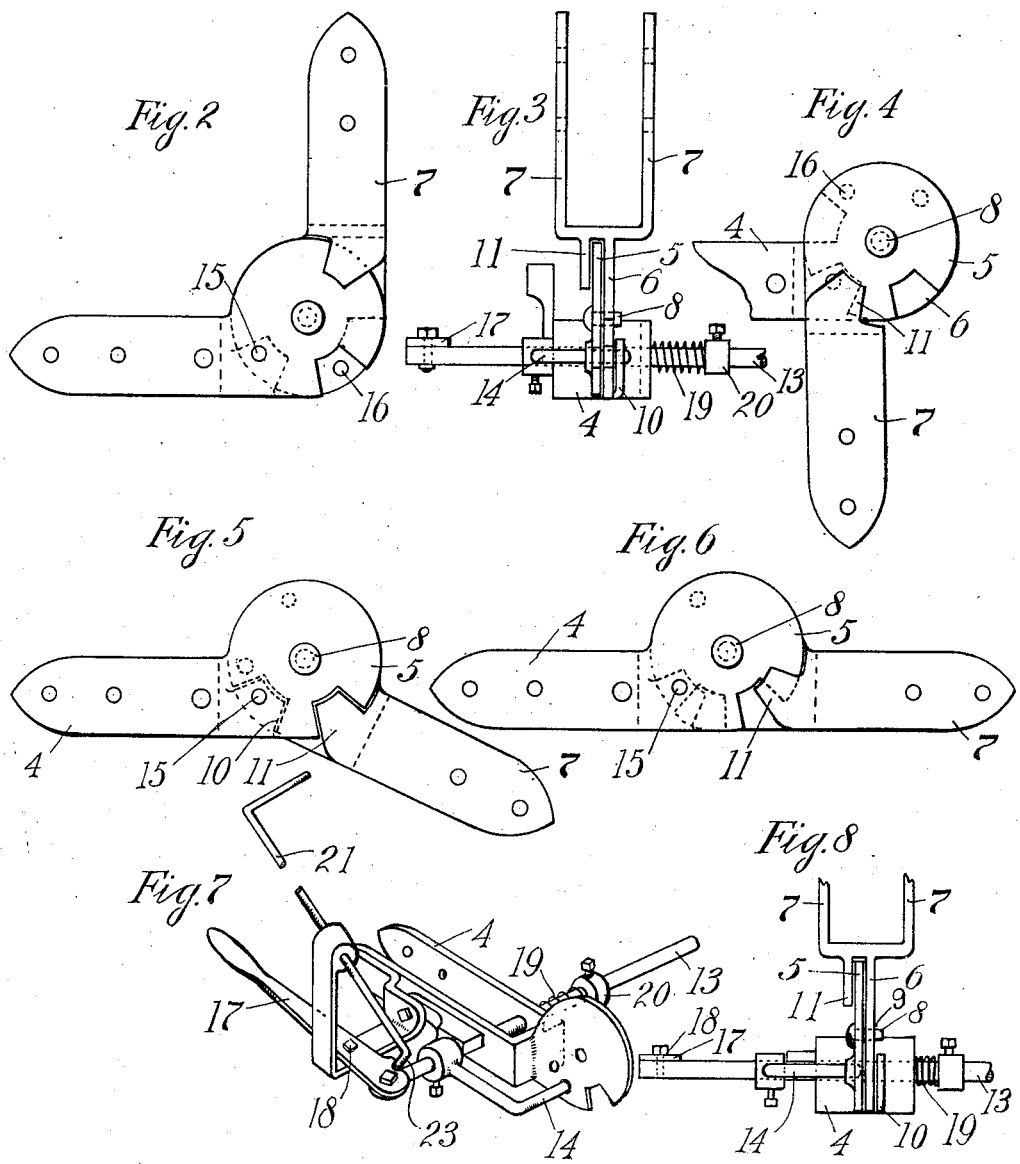

UNITED STATES PATENT OFFICE.

CHARLES GILLSON, OF MAPLETON, MINNESOTA.

HAY-RACK.

No. 897,363.

Specification of Letters Patent.

Patented Sept. 1, 1908.

Application filed September 26, 1907. Serial No. 394,663.

*To all whom it may concern:*

Be it known that I, CHARLES GILLSON, a citizen of the United States, residing at Mapleton, in the county of Blue Earth and State of Minnesota, have invented certain new and useful Improvements in Hay-Racks, of which the following is a specification.

My invention relates to improvements in hay racks, its object being particularly to provide an improved construction of stake holder for the rack and means for holding the same in adjusted positions.

To this end my invention consists in the features of construction and combination hereinafter particularly described and claimed.

In the accompanying drawings forming part of this specification, Figure 1 is a perspective view of my invention; Fig. 2 is a side elevation of one of the stake holders; Fig. 3 is an end view of the same; Fig. 4 is a side elevation partly broken away of the stake holders in depending position; Fig. 5 is a side elevation of the stake holder members in position for disconnection; Fig. 6 is a similar view of the stake holder extended; Fig. 7 is a perspective view of the actuating portion of the stake holder mechanism, and Fig. 8 is an end elevation of the same.

In the drawings is shown a hay rack of the usual construction consisting of longitudinal bars 2 with transverse bars 3. Secured upon the ends of the transverse bars 3 are brackets 4 each having a disked outer end 5. Rotatably supported upon the disked outer end 5 of each bracket is a stake holder comprising a disked inner end 6 and stake holding arms 7. The disk 5 has a pin 8 which extends through a central opening 9 in the disk 6, the two disks being held together by means of a flange 10 carried by the bracket and extending inwardly over the disk 6, and a flange 11 carried by the stake arms and extending inwardly over the disk 5. Each disk is formed with a cut-away portion so that when turned into the position shown in Fig. 5 the flanges 10 and 11 may pass through said cut-away portions to allow the members to be separated. Secured between the stake arms are suitable stakes or side bars 12.

In order to hold the stake holders in upright or extended positions as shown in Figs. 2 and 6 respectively I provide rods 13 slidably extending through the ends of the cross bars 3. Supported on said rods adjacent to each of the stake holders is a bent pin 14 with its outer end standing in alinement with a hole 15 in the disk 5. The disk 6 is formed with a series of holes 16 one of which will register with the hole 15 in the adjusted positions of the stake holder. Each rod 13 is provided at one end with an actuating handle 17 having pivotal support 18. By turning the handle upon its pivotal support the rod may be moved to carry the pins 14 out of locking position. The parts are held in locking position by a spring 19 surrounding one end of each rod and interposed between a nut 20 and the adjacent bracket 4.

In order to slide the rods 13 from the top of the load I provide rods 21 rotatably journaled in the brackets 22 and having bent lower ends 23. The bent lower ends of one set of rods bear against the adjacent ends of the rods 13 and the bent lower ends of the other set bear against the inner ends of the lever arms 17. Thus, turning anyone of said rods 21 to carry its bent lower end against the lever arm 17 or rod 13, as the case may be, will slide said rod 13 to release the stake holders.

When the stake holders are supported as shown in Fig. 1 the rack may be used for ordinary purposes. Securing the stake holders in extended position as shown in Fig. 6 will extend the sides of the rack and level the same to allow it to be used as a flat bottomed wagon and where it is desired to make more convenient the unloading of the rack, the stake holders may be turned into depending position, as shown in Fig. 4.

I claim:

1. In a rack of the class described the combination of cross bars, stake holders having hinge support upon the ends of said cross bars, a slidable rod journaled along side said stake holders and carrying pins registering with holes in said stake holders, and means for reciprocating said rods.

2. In a hay rack the combination with a cross bar, of brackets secured upon the ends of said cross bar, stake holders rotatable upon the ends of said brackets, said brackets and stake holders being formed with registering holes, longitudinally slidable rods alongside said rack and pins carried by said rods in position to pass through the holes in said brackets and holders.

3. In a hay rack the combination with outwardly extending brackets secured upon the sides of said rack, of stake holders having detachable rotatable support upon the ends of said brackets, longitudinally slidable rods along the sides of said rack, and means carried by said rods for interlocking with said holders and holding them in adjusted positions.

4. In a hay rack the combination with outwardly extending side brackets, of stake holders rotatably supported upon the ends of said brackets, means allowing disconnection of said holders and brackets when said holders are turned to a certain position, longitudinally adjustable rods along the sides of said rack and means carried by said rods for holding said holders in adjusted positions.

5. In a hay rack the combination of outwardly extending side brackets, stake holders having hinge support upon the ends of said brackets, means permitting disconnection of said brackets and holders when said holders are turned to a certain position, a longitudinally slidable rod provided with pins in position to extend through registering holes in said brackets and holders to hold the same in adjusted positions, and downwardly extending rods rotatably supported upon the ends of said rack in position to actuate said slidable rods in the manner and for the purpose set forth.

In testimony whereof I affix my signature in presence of two witnesses.

CHARLES GILLSON.

Witnesses:
  C. W. BORCHERT,
  C. M. ENDICOTT.